(12) United States Patent
Critelli et al.

(10) Patent No.: US 7,240,439 B2
(45) Date of Patent: Jul. 10, 2007

(54) MAGNETIC TAPE MEASURE END HOOK

(75) Inventors: James M. Critelli, Fuquay-Varina, NC (US); Lin Ping Lin, Taipei (TW)

(73) Assignee: Cooper Brands, Inc., Houston, TX (US)

( * ) Notice: Subject to any disclaimer, the term of this patent is extended or adjusted under 35 U.S.C. 154(b) by 95 days.

(21) Appl. No.: 11/243,197

(22) Filed: Oct. 4, 2005

(65) Prior Publication Data

US 2007/0074418 A1   Apr. 5, 2007

(51) Int. Cl.
*G01B 3/10* (2006.01)

(52) U.S. Cl. ..................... 33/758; 33/DIG. 1

(58) Field of Classification Search ............ 33/755, 33/758, DIG. 1
See application file for complete search history.

(56) References Cited

U.S. PATENT DOCUMENTS

| 992,170 | A | 5/1911 | Crane |
|---|---|---|---|
| 1,100,325 | A | 6/1914 | Pronovost |
| 2,663,941 | A | 12/1953 | Dart |
| 2,704,890 | A | 3/1955 | Welsch |
| 3,036,791 | A | 5/1962 | Siggelkow |
| 3,100,937 | A | 8/1963 | Burch |
| 3,145,477 | A | 8/1964 | Morrison |
| 3,193,232 | A | 7/1965 | Hatcher |
| 3,427,721 | A | 2/1969 | Moll |
| 3,611,576 | A | 10/1971 | Quenot |
| 3,744,134 | A | 7/1973 | Zima, Jr. |
| 3,983,635 | A | 10/1976 | Jarman |
| 4,294,016 | A | 10/1981 | Wilkerson |
| 4,352,244 | A | 10/1982 | Tomuro |
| 4,353,167 | A | 10/1982 | Martin |
| 4,441,259 | A | 4/1984 | Leitermann et al. |
| 4,527,334 | A | 7/1985 | Jones et al. |
| 4,532,709 | A | 8/1985 | Leumann et al. |
| 4,535,654 | A | 8/1985 | White |
| 4,580,347 | A | 4/1986 | McKnight |
| 4,615,618 | A | 10/1986 | Bailey et al. |
| 4,621,432 | A | 11/1986 | Law |
| 4,649,649 | A | 3/1987 | Fain |
| 4,656,751 | A | 4/1987 | White et al. |
| 4,787,244 | A | 11/1988 | Mikolajczyk |

(Continued)

FOREIGN PATENT DOCUMENTS

GB   696508   9/1953

(Continued)

*Primary Examiner*—Christopher W Fulton
(74) *Attorney, Agent, or Firm*—Coats & Bennett, P.L.L.C.

(57) ABSTRACT

A magnetic end hook for a tape measure has a hook member having a mounting section extending in a first direction and a hooking section extending away from the mounting section in a second direction generally transverse to the first direction. A distinct bezel affixes to the hooking section so as to capture a magnet between the bezel and the hooking section. A magnet is disposed at least partially in a hole in the hooking section and a hole in the bezel so as to be visible from both front and rear views of the end hook. The magnet may include flanges and a fastener, such as a rivet, may secure the bezel in place. There may be a second magnet similarly situated. A tape measure and methods of assembly are also described.

29 Claims, 3 Drawing Sheets

U.S. PATENT DOCUMENTS

| | | | |
|---|---|---|---|
| 4,827,622 | A | 5/1989 | Makar |
| 4,924,597 | A | 5/1990 | Tursi |
| 4,930,227 | A | 6/1990 | Ketchpel |
| 4,970,796 | A | 11/1990 | Masters et al. |
| 4,972,598 | A | 11/1990 | Charters, Jr. |
| 4,976,048 | A | 12/1990 | Blackman |
| 5,046,262 | A | 9/1991 | Kerbaugh |
| 5,077,911 | A | 1/1992 | von Wedemeyer |
| 5,103,574 | A | 4/1992 | Levy |
| 5,175,940 | A | 1/1993 | Naill et al. |
| 5,367,785 | A | 11/1994 | Benarroch |
| 5,379,524 | A | 1/1995 | Dawson |
| 5,402,583 | A | 4/1995 | Komura |
| 5,416,978 | A | 5/1995 | Kaufman |
| 5,421,094 | A | 6/1995 | McCord et al. |
| 5,421,100 | A | 6/1995 | Leore |
| 5,425,181 | A | 6/1995 | Calvert |
| 5,458,946 | A | 10/1995 | White, Jr. |
| 5,531,028 | A | 7/1996 | Flippen |
| 5,544,420 | A | 8/1996 | Choi |
| 5,659,970 | A | 8/1997 | Reedy |
| 5,760,938 | A | 6/1998 | Hodge |
| 5,815,940 | A | 10/1998 | Valentine, Sr. |
| 5,845,412 | A | 12/1998 | Arcand |
| 5,894,677 | A | 4/1999 | Hoffman |
| D409,104 | S | 5/1999 | Yang |
| 6,029,359 | A | 2/2000 | Szumer |
| D423,382 | S | 4/2000 | Piotrkowski |
| 6,070,338 | A | 6/2000 | Garity |
| 6,073,983 | A | 6/2000 | Schroeder |
| 6,098,297 | A | 8/2000 | Belfiore |
| 6,115,931 | A | 9/2000 | Arcand |
| 6,178,655 | B1 | 1/2001 | Potter et al. |
| 6,199,287 | B1 | 3/2001 | Rankila |
| 6,223,446 | B1 | 5/2001 | Potter |
| 6,226,886 | B1 | 5/2001 | Lamond et al. |
| D447,069 | S | 8/2001 | Budrow |
| 6,295,739 | B1 | 10/2001 | Kraft |
| 6,311,407 | B1 | 11/2001 | Muraishi |
| 6,338,681 | B1 | 1/2002 | Lin |
| D453,303 | S | 2/2002 | Lin |
| 6,349,482 | B1 | 2/2002 | Gilliam |
| 6,370,790 | B1 | 4/2002 | Stenger |
| D457,450 | S | 5/2002 | Lamond et al. |
| D458,163 | S | 6/2002 | Kang |
| 6,442,863 | B1 | 9/2002 | Poineau et al. |
| 6,470,589 | B2 | 10/2002 | Simmons |
| 6,511,112 | B2 | 1/2003 | Schroeder |
| D470,063 | S | 2/2003 | Arnold |
| 6,546,644 | B2 | 4/2003 | Poineau et al. |
| 6,568,099 | B2 | 5/2003 | Bergeron |
| 6,637,126 | B2 | 10/2003 | Balota |
| 6,658,756 | B1 | 12/2003 | Sanchez, Jr. |
| 6,663,153 | B2 | 12/2003 | Brunson |
| 6,678,967 | B1 | 1/2004 | Jueneman |
| D486,086 | S | 2/2004 | Jueneman |
| 6,463,052 | B1 | 9/2004 | Lin |
| 6,857,198 | B1 | 2/2005 | Lin |
| 6,874,245 | B2 | 4/2005 | Liu |
| D504,628 | S | 5/2005 | Weeks et al. |
| 7,124,515 | B2 * | 10/2006 | Juenemann ................ 33/758 |
| 2002/0073569 | A1 | 6/2002 | Simmons |
| 2003/0167651 | A1 | 9/2003 | Pedersen |
| 2003/0233762 | A1 | 12/2003 | Blackman et al. |

FOREIGN PATENT DOCUMENTS

| | | |
|---|---|---|
| JP | 10030901 | 2/1998 |
| WO | WO 00/33017 | 6/2000 |

* cited by examiner

MAGNETIC TAPE MEASURE END HOOK

BACKGROUND OF THE INVENTION

The present invention is directed generally to tape measures of the type commonly used to measure linear distances.

Modern tape measures (or "tape rules") typically include an L-shaped metallic end hook for hooking onto measurement surfaces. Such end hooks, while being available in a wide variety of shapes and sizes, all basically operate by being either pressed against a surface for an abutting-type measurement, or hooked over a suitable edge for a hooking-type measurement. However, it is sometimes difficult to keep the end hook in the desired location. As such, various approaches have been proposed to provide alternative means for helping keep the end hook in the desired location. One area receiving attention is the addition of magnets to the end hook so that the end hook may be at least partially magnetically coupled to metallic measurement surfaces (e.g., metal wall studs). While a number of magnetic end hook configurations have been proposed, none have proven entirely satisfactory. As such, there remains a need for alternative magnetic end hook designs.

SUMMARY OF THE INVENTION

In one embodiment, the present invention is directed to a magnetic end hook assembly for a tape measure, such as a power-return tape measure, and/or a method of assembling the same. The end hook may comprise a hook member having a mounting section extending in a first direction and a hooking section extending away from the mounting section in a second direction generally transverse to the first direction; the hook member mounting to the blade via the mounting section; the hooking section having at least a first hole therethrough; a first magnet; a bezel distinct from, but affixed to, the hooking section so as to capture the first magnet between the bezel and the hooking section, the bezel having at least a second hole therethrough; wherein the first magnet extends into the first and second holes so as to be visible from both a front view and a rear view of the end hook. The first magnet may comprise flanges disposed between the hooking section and the bezel. A fastener, such as a rivet, may secure the bezel to the hook member. The bezel may mount on a forward face of the hooking section, advantageously with a front face of the first magnet substantially flush with a front face of the bezel and a rear face of the first magnet substantially flush with a rear face of the hooking section. The hooking section or the bezel may further comprise an alignment boss, with the other of the hooking section and the bezel having a corresponding alignment hole that engages the alignment boss. The hooking section may further comprise a third hole and the bezel may comprise a fourth hole, and the end hook may further comprise a second magnet disposed between hooking section and the bezel and extending into the third and fourth holes so as to be visible from both the front view and the rear view of the end hook.

In another embodiment, the present invention is directed to a tape measure that incorporates a magnetic end hook. The tape measure may be a power-return tape measure comprising: a housing having first and second sidewalls and a peripheral wall extending between the sidewalls; the peripheral wall having a tape opening; a tape measure blade coupled to the housing and having a retraction bias applied thereto; the tape blade selectively deployable from said housing via said tape opening; an end hook assembly attached to an end portion of the tape blade; the end hook assembly being as described above.

In another embodiment, a method of assembling an end hook may comprise: providing a hook member having a mounting section extending in a first direction and a hooking section extending away from the mounting section in a second direction generally transverse to the first direction; mounting a first magnet to the hook member by attaching a bezel to the hooking section to thereby clamp the first magnet between the bezel and the hooking section. The method may be such that, after the mounting, the first magnet is visible from both a front view and a rear view of the end hook. The first magnet may comprise flanges disposed between the hooking section and the bezel. The mounting may comprise securing the bezel to the hook member with a fastener, such as by riveting. The hooking portion may comprise a first hole and the bezel may comprise a second hole; and the mounting may comprise clamping the first magnet between the bezel and the hooking section so that the magnet extends into the first and second holes. The method may further comprise mounting a second magnet to the hook member by the step of attaching the bezel to the hooking section and thereby clamp the second magnet between the bezel and the hooking section.

DETAILED DESCRIPTION OF THE INVENTION

Figure 1:
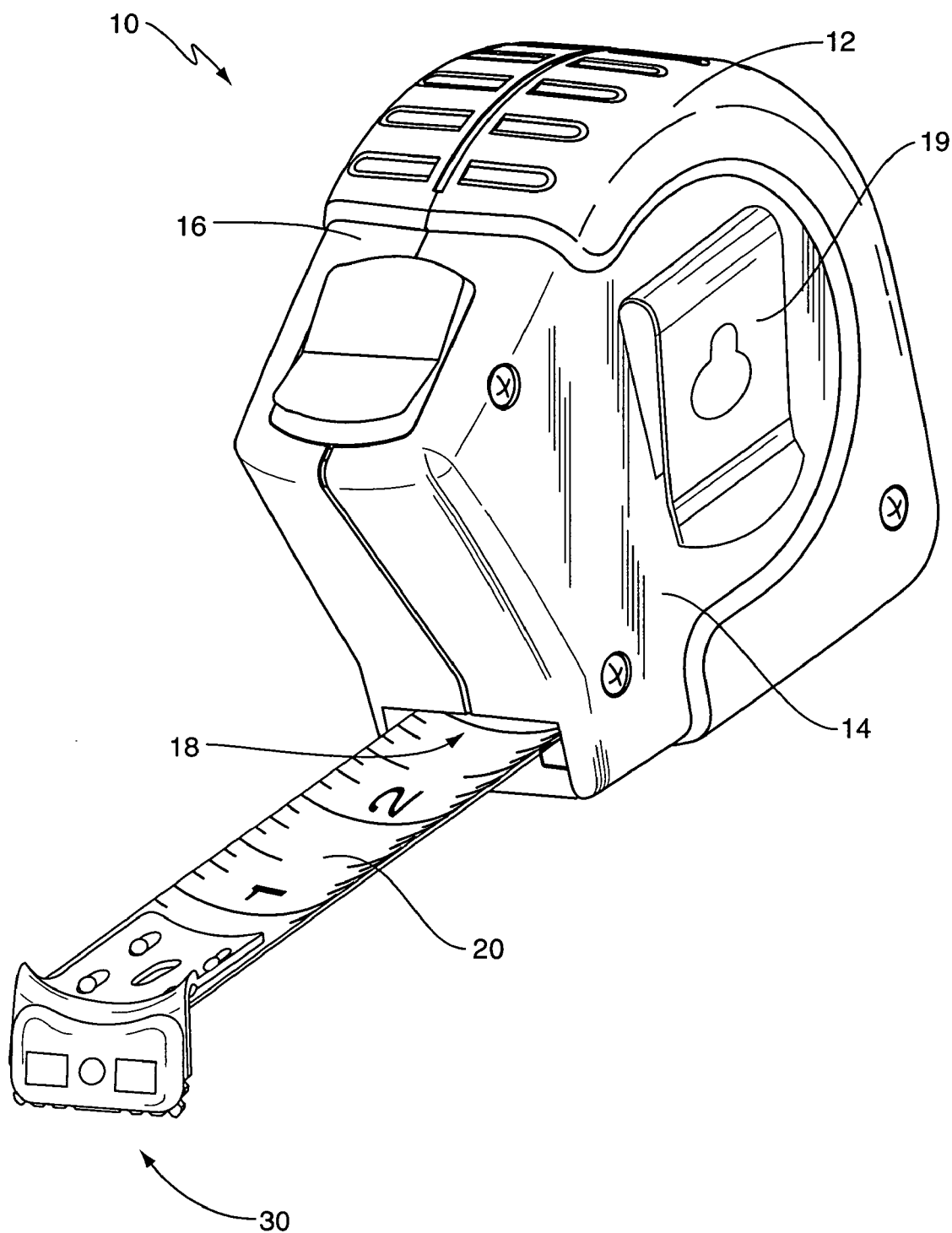
FIG. 1 is a perspective view of one tape measure embodiment constructed in accordance with the present invention.

As illustrated in FIG. 1, a tape measure, generally designated 10, is shown constructed according to one embodiment of the present invention. The tape measure 10 includes a housing 12, a coilable measuring tape or blade 20, and an end hook assembly 30. The housing 12 typically has a generally squarish shape, with a rounded upper-rear corner, and may have a slightly projecting nose. The housing 12 includes an opposing pair of sidewalls 14 and an interconnecting peripheral wall 16 which help define an internal chamber (not shown) that houses the coiled portion of the tape 20, a suitable tape-biasing device (e.g., retraction spring), and portions of the blade locking mechanism. The housing 12 typically includes an opening 18 near its lower-front corner that connects to the internal chamber. The distal end of the tape 20 extends through this opening 18 for selective deployment therefrom. The housing 12 is preferably sized to fit within a user's hand and/or conveniently stored on a work belt or in a toolbox. A belt clip 19 may be attached to a side of the housing 12 and may take any form known in the art, such as the conventional modified "R" shape well known in the art. As the general design and operation of power-return tape measures are well known in the art, additional detailed discussion thereof is omitted herein for brevity. However, additional discussion may be found in U.S. Pat. Nos. 4,527,334; 4,976,048; and 6,349,482 and U.S. Patent Application Publication 2003/0233762, which are incorporated herein by reference.

As is conventional, the end hook assembly 30 is attached to the distal end of the tape 20. The end hook assembly 30 helps prevent the tape 20 from being completely retracted into the housing 12 and provides a convenient measurement reference point. The tape end hook assembly 30, or simply end hook, includes a hook member 32, a bezel 50, one or more magnets 60a,60b, and a rivet 70. The rivet 70 secures the bezel 50 to the hook member 32, sandwiching the magnets 60a,60b between the bezel 50 and the hook member 32. It is intended that the end hook assembly 30 of the present invention attach to a measurement surface via magnetic and/or mechanical means.

Figure 2:
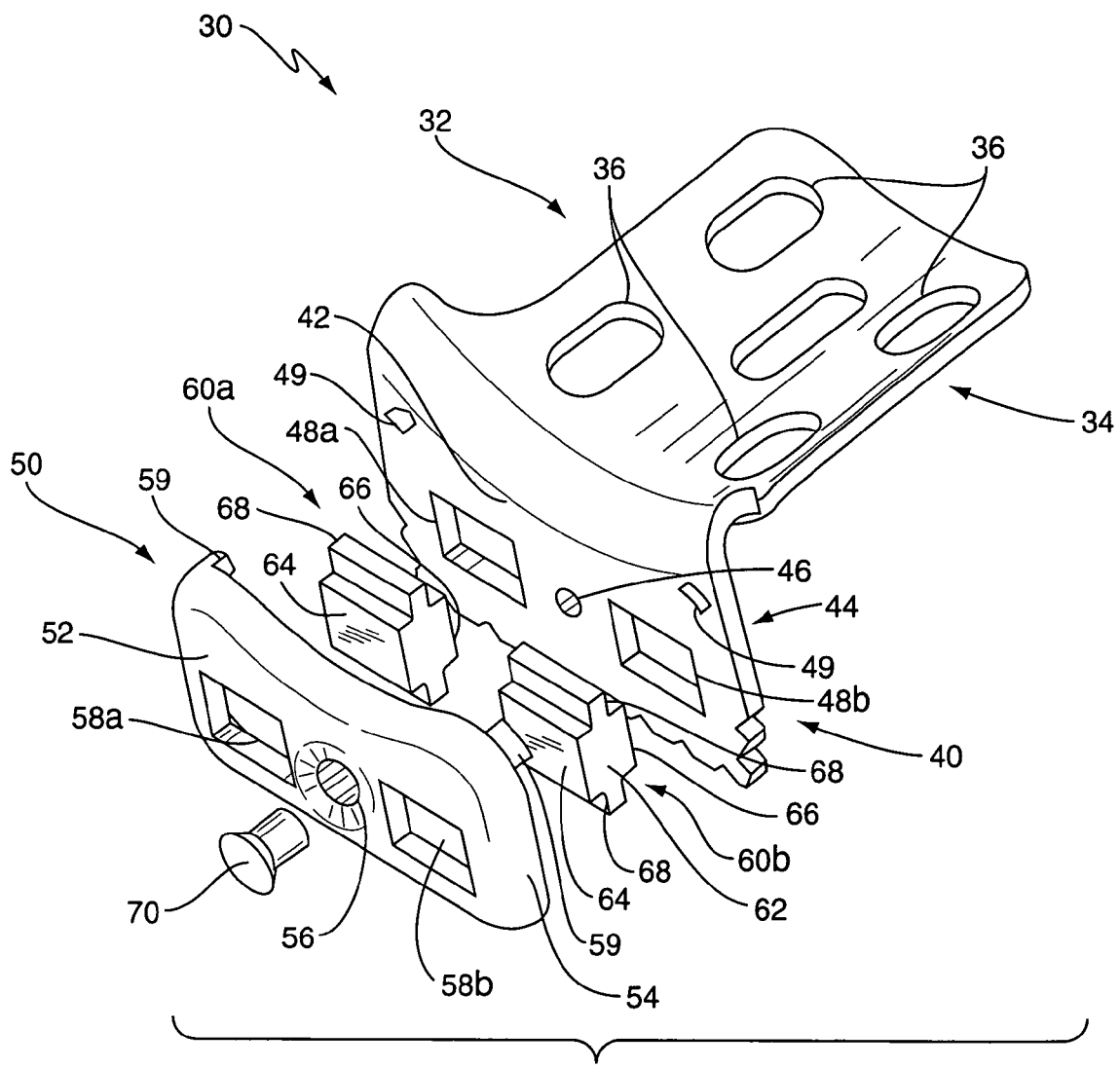
FIG. 2 is an exploded view of one embodiment of an end hook in accordance with the present invention.

The hook member 32 may be generally L-shaped with a mounting portion 34 and a hooking portion 40. The mounting portion 34 extends generally along the tape blade 20 in a front/back direction 38 and provides a location for attaching the end hook 30 to the tape blade 20. As such, the mounting portion 34 should be contoured to match the corresponding section of the tape blade 20, such as being slightly concavo-convex in cross section. The mounting portion 34 may include suitable rivet holes 36, or other means known in the art, for attaching the end hook 30 to the tape blade 20 in any conventional fashion. The rivet holes 36 may advantageously be oval shaped to allow for an appropriate amount of movement of hook member 32 along axis 38 so as to maintain appropriate positioning for abutting and hooking measurements. The hooking portion 40 extends away from the mounting portion 34, advantageously generally perpendicularly thereto. The hooking portion 40 of FIG. 2 includes a fastener hole 46 and two registration holes 48a,48b. The fastener hole 46 is advantageously centered on the front face 42 of the hooking portion 40, and is sized to accept the rivet 70, as discussed further below. The registration holes 48a,48b flank the fastener hole 46, and advantageously have a rectangular (e.g., square) shape. Both the registration holes 48a,48b, and advantageously also the fastener hole 46, extend all the way through the hooking portion 40.

The bezel 50 mounts to the front face 42 of the hooking portion 40, and is held thereagainst by the rivet 70 so as to clamp the magnets 60a,60b in place. In simple terms, the bezel 50 is a frame with a front face 52 and a peripheral wall 54. The bezel's front face 52 is similar to that of the hooking portion's front face 42, with a central fastener hole 56 and two registration holes 58a,58b. It should be noted that it is believed advantageous if the central fastener hole 56 is somewhat countersunk or otherwise slightly recessed, so as to reduce or eliminate forward protrusion of the rivet 70 after assembly. The peripheral wall 54 extends rearwardly from the front face 52, toward the hooking portion 40, and advantageously has a thickness that is slightly less than that of the magnets 60a,60b. For size, it is believed advantageous if the front view footprint of the bezel 50 is no larger than, and preferably smaller than, the front view footprint of the hooking portion 40. When mounted to the hooking portion 40, the bezel 50 extends forward from the front face 42 of the hooking portion 40.

Each of the magnets 60a,60b may be thought of as having a main body 62 and one or more side flanges 68. The main body 62 has a shape that generally corresponds to that of the registration holes, with a smooth, planar front face 64 and rear face 66. For most embodiments, it is intended that the main body 62 extend into the corresponding registration holes, advantageously to the extent that the faces 64,66 of the magnet 60a,60b are flush with the corresponding faces of the hooking portion 40 and bezel 50. For example, for a front mounted bezel 50, the front face 64 of magnet 60a should advantageously be flush with the bezel's front face 52 and the rear face 66 of magnet 60a should be flush with rear face 44 of the hooking portion 40. The side flanges 68 extend outward from the main body 62, advantageously vertically up and down and parallel to the front and rear faces 62,64. As can be seen in the figures, the flanges 68 have a thickness that is less than the thickness of the main body 62, advantageously by an amount equal to the thickness of the hooking portion 40 plus the thickness of the bezel 50. The flanges 68 act to prevent the magnet 60a,60b from passing completely through the corresponding registration holes, thereby helping keep the magnet 60a,60b trapped between the bezel 50 and the hooking portion 40.

The end hook 30 is assembled by placing the magnets 60a,60b in the corresponding registration holes 48a,48b in hooking portion 40. A portion of each magnet 60a,60b rests in the corresponding registration hole 48a,48b in the hooking portion 40, with the flanges 68 resting against the front face 42 of the hooking portion 40. The bezel 50 is then placed over the magnets 60a,60b, and rivet 70 is inserted through fastener holes 46,56. The rivet 70 is then upset to solidly secure the bezel 50 to the hook member 32. This action captures the magnets 60a,60b between the bezel 50 and the hooking portion 40 with a clamping or sandwich action, with the majority of the main body 62 of the magnets 60a,60b being disposed forward of the hooking portion 40. It should be noted that the bezel 50 may advantageously include two or more pegs or bosses 59, if desired, that mate with corresponding recesses or holes 49 in the hooking portion 40, to aid in maintaining the relative alignment of the parts, both during and after assembly. Or, some or all of the locations of the bosses 59 and holes 49 may be reversed. With the bezel 50 and magnets 60a,60b joined to the hook member 32, the end hook assembly 30 may be then attached to the tape blade 20 using conventional techniques.

Figure 3:
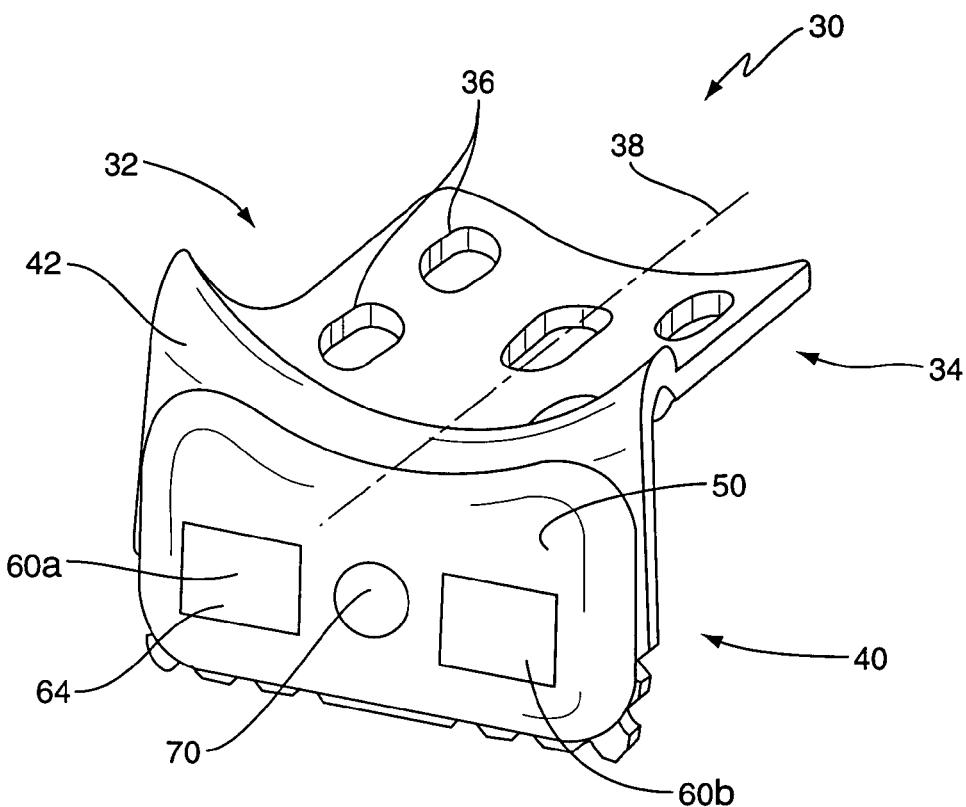
FIG. 3 is a front perspective view of the end hook embodiment of FIG. 2.
Figure 4:
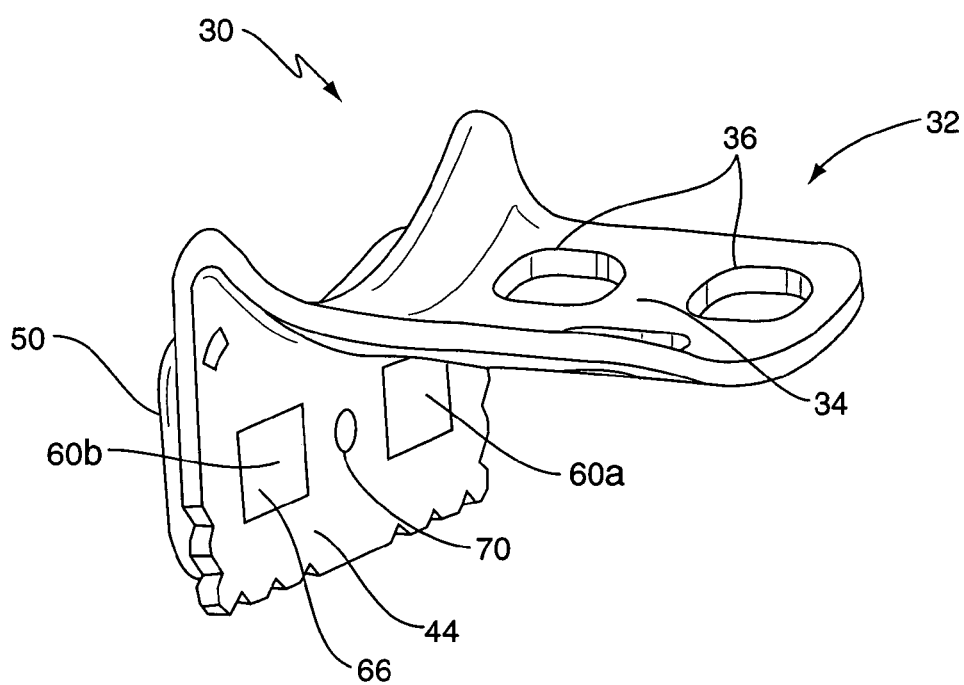
FIG. 4 is a rear perspective view of the end hook embodiment of FIG. 2.

The magnets 60a,60b are mounted so as to extend into the alignment holes in both the bezel 50 and the hooking portion 40, and are positioned to be visible in both a front and a rear view of the end hook 30. See FIG. 3 and FIG. 4, respectively. Further, as discussed above, the magnets 60a,60b are advantageously sized such that they are flush mounted with the front face 52 of the bezel 50 and the rear face 44 of the hooking portion 40. Thus, the magnets 60a, 60b can easily engage a metallic measurement surface either in front of the hook member 30 (abutting measurement) or behind the hook member 30 (hooking measurement).

For materials, the entire end hook assembly 30 may be made from metal, if desired. Alternatively, one or more of the parts may be made from other suitable materials, such as plastics and the like; however, metallic materials are believed to be best for encouraging the desired magnetic coupling to the measurement surface. Advantageously, the materials chosen should allow the overall weight of the end hook assembly 30 to be kept low, so as to minimize any adverse effect on overall tape blade standout. The magnets 60a,60b may be made from any suitable material known in the art, such as sintered neodymium iron boron (e.g., N3867). Advantageously, the magnets 60a,60b should be strong enough, both magnetically and mechanically, to support the entire weight of the tape measure 10 when the tape measure 10 is hung from an overhead surface, such as a suspended ceiling cross-member.

The discussion above has assumed that the bezel 50 mounts on the front face 42 of the hooking portion 40; however, such is not required in all embodiments. In some alternative embodiments (not shown), the bezel 50 may attach to, and extend rearwardly from, the rear face 44 of the hooking portion 40, although this is believed to be a less robust configuration. For such a configuration, the front face 64 of the magnet 60*a* may advantageously be substantially flush with the front face of 42 the hooking portion 40, and the rear face 66 of the magnet 60*a* may be substantially flush with the rearwardly oriented face 52 of the bezel 50.

Similarly, the discussion above has assumed that rivet 70 secures bezel 50 to hooking portion 40; however, this is not required in all embodiments. For example, a screw may be substituted for rivet 70. For such an arrangement, it is believed advantageous to thread the fastener mounting hole 46 of the hooking portion 40 so as to eliminate the need for a projecting nut or the like. Other means may also be employed to attach the bezel 50 to the hooking portion 40, either separately or in conjunction with a fastener 70; however a fastener-based approach is believed most robust.

The discussion above has generally assumed that two or more magnets 60*a*,60*b* are used; however, this is not required in all embodiments. For some embodiments, only a single magnet (e.g., magnet 60*a*) may be used, although such an arrangement is believed to be less resistant to twisting of the end hook assembly 30 against the measurement surface. Further, if two magnets 60*a*,60*b* are used, it is believed advantageous if both magnets are visible in front and rear views of the end hook assembly 30; however, one of the magnets may be hidden if desired.

It should be understood that the tape measures 10 of the present invention may also include other features, such as shock-absorbing bumpers proximate the opening 18, specially coated blades 20, various locking mechanisms, and like, all of which are known in the art.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A power-return tape measure, comprising:
    a housing having first and second sidewalls and a peripheral wall extending between said sidewalls; said peripheral wall having a tape opening;
    a tape measure blade coupled to said housing and having a retraction bias applied thereto; said tape blade selectively deployable from said housing via said tape opening;
    an end hook assembly attached to an end portion of said tape blade; said end hook assembly comprising:
        a hook member having a mounting section extending in a first direction and a hooking section extending away from said mounting section in a second direction generally transverse to said first direction; said hook member mounting to said blade via said mounting section; said hooking section having at least a first hole therethrough;
        a first magnet;
        a bezel distinct from, but affixed to, said hooking section so as to capture said first magnet between said bezel and said hooking section, said bezel having at least a second hole therethrough; and
        wherein said first magnet extends into said first and second holes so as to be visible from both a front view and a rear view of said end hook assembly.

2. The tape measure of claim 1 wherein said first magnet comprises flanges disposed between said hooking section and said bezel.

3. The tape measure of claim 1 further comprising a fastener securing said bezel to said hook member.

4. The tape measure of claim 3 wherein said fastener comprises a rivet.

5. The tape measure of claim 1 wherein said bezel mounts on a forward face of said hooking section.

6. The tape measure of claim 5 wherein a front face of said first magnet is substantially flush with a front face of said bezel, and a rear face of said first magnet is substantially flush with a rear face of said hooking section.

7. The tape measure of claim 1 wherein a first of said hooking section and said bezel further comprises an alignment boss and the other said hooking section and said bezel further comprises a corresponding alignment hole that engages said alignment boss.

8. The tape measure of claim 1 wherein said hooking section further comprises a third hole and said bezel comprises a fourth hole, and further comprising a second magnet disposed between hooking section and said bezel and extending into said third and fourth holes so as to be visible from both said front view and said rear view of said end hook assembly.

9. The tape measure of claim 1:
    further comprising a rivet securing said bezel to said hook member;
    wherein said hooking section further comprises a third hole and said bezel comprises a fourth hole;
    further comprising a second magnet disposed between hooking section and said bezel and extending into said third and fourth holes so as to be visible from both said front view and said rear view of said end hook; and
    wherein said first and second magnets each comprise flanges disposed between said hooking section and said bezel.

10. The tape measure of claim 9 wherein said bezel mounts on a forward face of said hooking section; and wherein a front face of said first magnet is substantially flush with a front face of said bezel and a rear face of said first magnet is substantially flush with a rear face of said hooking section.

11. A tape measure end hook for attaching to a tape measure blade, comprising:
    a hook member having a mounting section extending in a first direction and a hooking section extending away from said mounting section in a second direction generally transverse to said first direction; said hook member adapted to mate with the tape measure blade via said mounting section;
    said hooking section having at least a first hole therethrough;
    a first magnet;
    a bezel distinct from, but affixed to, said hooking section so as to capture said first magnet between said bezel and said hooking section, said bezel having at least a second hole therethrough;
    wherein said first magnet extends into said first and second holes so as to be visible from both a front view and a rear view of said end hook.

12. The end hook of claim 11 wherein said first magnet comprises flanges disposed between said hooking section and said bezel.

13. The end hook of claim 11 further comprising a fastener securing said bezel to said hook member.

14. The end hook of claim 13 wherein said fastener comprises a rivet.

15. The end hook of claim 11 wherein said bezel mounts on a forward face of said hooking section.

16. The end hook of claim 15 wherein a front face of said first magnet is substantially flush with a front face of said bezel and a rear face of said first magnet is substantially flush with a rear face of said hooking section.

17. The end hook of claim 11 wherein a first of said hooking section and said bezel further comprises an alignment boss and the other said hooking section and said bezel further comprises a corresponding alignment hole that engages said alignment boss.

18. The end hook of claim 11 wherein said hooking section further comprises a third hole and said bezel comprises a fourth hole, and further comprising a second magnet disposed between hooking section and said bezel and extending into said third and fourth holes so as to be visible from both said front view and said rear view of said end hook.

19. The end hook of claim 11:
further comprising a rivet securing said bezel to said hook member;
wherein said hooking section further comprises a third hole and said bezel comprises a fourth hole;
further comprising a second magnet disposed between hooking section and said bezel and extending into said third and fourth holes so as to be visible from both said front view and said rear view of said end hook; and
wherein said first and second magnets each comprise flanges disposed between said hooking section and said bezel.

20. The end hook of claim 19 wherein said bezel mounts on a forward face of said hooking section; and wherein a front face of said first magnet is substantially flush with a front face of said bezel and a rear face of said first magnet is substantially flush with a rear face of said hooking section.

21. A method of assembling a tape measure end hook, comprising:
providing a hook member having a mounting section extending in a first direction and a hooking section extending away from said mounting section in a second direction generally transverse to said first direction;
mounting a first magnet to said hook member by attaching a bezel to said hooking section to thereby clamp said first magnet between said bezel and said hooking section.

22. The method of claim 21 wherein said first magnet comprises flanges disposed between said hooking section and said bezel.

23. The method of claim 21 wherein said mounting comprises securing said bezel to said hook member with a fastener.

24. The method of claim 23 wherein said mounting comprises riveting said bezel to said hook member.

25. The method of claim 21 wherein said mounting a first magnet comprises mounting a second magnet to said hook member by said attaching said bezel to said hooking section and thereby clamp said second magnet between said bezel and said hooking section.

26. The method of claim 21 further comprising attaching said end hook to a tape measure blade via said mounting section.

27. A method of assembling a tape measure end hook, comprising:
providing a hook member having a mounting section extending in a first direction and a hooking section extending away from said mounting section in a second direction generally transverse to said first direction;
mounting a first magnet to said hook member by attaching a bezel to said hooking section to thereby clamp said first magnet between said bezel and said hooking section;
wherein, after said mounting, said first magnet is visible from both a front view and a rear view of said end hook.

28. A method of assembling a tape measure end hook, comprising:
providing a hook member having a mounting section extending in a first direction and a hooking section extending away from said mounting section in a second direction generally transverse to said first direction;
mounting a first magnet to said hook member by attaching a bezel to said hooking section to thereby clamp said first magnet between said bezel and said hooking section;
wherein said hooking portion comprises a first hole and said bezel comprises a second hole; wherein said mounting comprises clamping said first magnet between said bezel and said hooking section so that said first magnet extends into said first and second holes.

29. The method of claim 28 wherein said mounting comprises mounting said first magnet to said hook member so that a front face of said first magnet is substantially flush with a front face of said bezel and a rear face of said first magnet is substantially flush with a rear face of said hooking section.

* * * * *